US012675460B2

(12) United States Patent
Gandhi et al.

(10) Patent No.: US 12,675,460 B2
(45) Date of Patent: Jul. 7, 2026

(54) N-WAY MULTIMASTER REPLICATION SYSTEM AND METHOD THEREOF

(71) Applicant: Tata Consultancy Services Limited, Mumbai (IN)

(72) Inventors: Aman Gandhi, Mumbai (IN); Jyoti Mahajan, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 19/079,932

(22) Filed: Mar. 14, 2025

(65) Prior Publication Data

US 2026/0093683 A1     Apr. 2, 2026

(30) Foreign Application Priority Data

Mar. 14, 2024     (IN) .............................. 202421018771

(51) Int. Cl.
| | |
|---|---|
| *G06F 7/00* | (2006.01) |
| *G06F 16/00* | (2019.01) |
| *G06F 16/23* | (2019.01) |
| *G06F 16/29* | (2019.01) |

(52) U.S. Cl.
CPC .............. *G06F 16/23* (2019.01); *G06F 16/29* (2019.01)

(58) Field of Classification Search
None
See application file for complete search history.

(56) References Cited

U.S. PATENT DOCUMENTS

| | | |
|---|---|---|
| 7,962,458 B2 | 6/2011 | Holenstein et al. |
| 8,250,029 B2 | 8/2012 | Holenstein et al. |
| 10,860,612 B2 | 12/2020 | Lee et al. |
| 11,061,924 B2 | 7/2021 | Barve et al. |

*Primary Examiner* — Tony Mahmoudi
(74) *Attorney, Agent, or Firm* — Finnegan, Henderson, Farabow, Garrett & Dunner, LLP

(57) ABSTRACT

In distributed data management traditional databases often struggle to maintain consistency and handle conflicts. Traditional solutions prioritize specific combinations of properties, resulting in trade-offs that impact user experience and application functionality. Present disclosure provides systems and methods that route incoming transaction associated with application to corresponding database server (DBS) by integrating geographical proximity mean value, and sender internet protocol affinity value. The incoming transaction is processed to extract data manipulation language (DML) operation written by the application and replicated to each DBS other than a DBS on which the application is directly applying a data through the incoming transactions. A primary key is generated by allocating an unique identifier if the DML operation is inserted on identified DBS. The primary key of record is updated from the incoming transaction. A conflict associated with parent and child association of the DML operation is dynamically monitored based on integrity Foreign key Constraint.

17 Claims, 11 Drawing Sheets

Extract: Exclude User = Rep_User

Application Tx: App_user

Replicated Tx Apply: Rep_User

Extract: Exclude User = Rep_User

Application Tx: App_user

Replicated Tx Apply: Rep_User

Extract: Exclude User = Rep_User

Application Tx: App_user

Replicated Tx Apply: Rep_User

Extract: Exclude User = Rep_User

Application Tx: App_user

Replicated Tx Apply: Rep_User

202A-D

| Take Downtime |

↓

| Record Global Timestamp T_Add |

↓

| Assign a Site_Id n+1 to new database server DBSn+1 |

| Application Transaction Routed to DB server |

↓

| Get NextVal from DB Sequence (V) i.e. increment By n+1 |

↓

| Apply logic P= V+Site_Id-1 |

↓

| Apply Transaction |

700 routing, by a transaction router, at least one incoming transaction associated with an application to at least one corresponding database server (DBS) by implementing a logic that integrates a geographical proximity mean value (GPMV) and a sender internet protocol (IP) affinity value (SIPAV) <u>802</u> processing, via one or more hardware processors, the at least one incoming transaction to extract at least one data manipulation language (DML) operation written directly by the application using a change data capture mechanism from a database and replicated to each DBS other than a DBS on which the application is directly applying a data through one or more incoming transactions <u>804</u> generating, via the one or more hardware processors, a primary key by allocating at least one unique identifier if the at least one data manipulation language (DML) operation is inserted on an identified database server (DBS) <u>806</u> updating, via the one or more hardware processors, at least one primary key of a record from the at least one incoming transaction <u>808</u> dynamically monitoring, via the one or more hardware processors, if there is a conflict associated with a parent and a child association of at least one data manipulation language (DML) operation based on an integrity Foreign key Constraint error obtained by processing at least one inserted primary key on the record from the at least one incoming transaction <u>810</u>

N-WAY MULTIMASTER REPLICATION SYSTEM AND METHOD THEREOF

PRIORITY CLAIM

This U.S. patent application claims priority under 35 U.S.C. § 119 to: India application No. 202421018771, filed on Mar. 14, 2024. The entire contents of the aforementioned application are incorporated herein by reference.

TECHNICAL FIELD

This disclosure relates generally to data management, and, more particularly, to N-way Multimaster replication system and method thereof.

BACKGROUND

In distributed data management traditional databases often struggle to maintain consistency and handle conflicts in such environments. The increasing dependence on geographically dispersed data and applications within distributed systems necessitates databases that provide consistent, available, and resilient data access. However, a Consistency, Availability and Partition Tolerance (CAP) theorem asserts that it is impossible to simultaneously achieve all three properties in a distributed system prone to network partitions. Traditionally, database solutions prioritize specific combinations of these properties, often resulting in trade-offs that impact user experience and application functionality. There is an availability and throughput demands lead the services to be distributed on a geographical scale where data is replicated asynchronously among different geographical regions. A data access request is not necessarily guaranteed to be consistent with updates made to the data i.e., one or more recent updates may not yet be applied to the data. N-way Multimaster databases find application in various industries where distributed and synchronized data management is crucial. Existing replication techniques which essentially either make the flow uni-directional thus by compromising end user experience or in replication makes last writer win thus by losing a critical data set. Existing approach changes the replication pipeline based on load. Existing approach handles conflicts via some rules however record loss becomes unavoidable.

SUMMARY

Embodiments of the present disclosure present technological improvements as solutions to one or more of the above-mentioned technical problems recognized by the inventors in conventional systems. For example, in one aspect, a method of replicating data across one or more database servers (DBS) by interacting with a N-way Multimaster database replication framework is provided. The processor implemented method includes: routing, by a transaction router, at least one incoming transaction associated with an application to at least one corresponding database server (DBS) by implementing a logic that integrates a geographical proximity mean value (GPMV) and a sender internet protocol (IP) affinity value (SIPAV); processing, via one or more hardware processors, one or more incoming transaction to extract one or more data manipulation language (DML) operations written directly by the application using a change data capture mechanism from a database and replicated to each DBS other than a DBS on which the application is directly applying a data through one or more incoming transactions; generating, via the one or more hardware processors, a primary key by allocating at least one unique identifier if the at least one data manipulation language (DML) operation is inserted on an identified database server (DBS); updating, via the one or more hardware processors, at least one primary key of a record from the incoming transaction; and dynamically monitoring, via the one or more hardware processors, if there is a conflict associated with a parent and a child association of at least one data manipulation language (DML) operation based on an integrity Foreign key Constraint error obtained by processing at least one inserted primary key on the record from the incoming transaction. The incoming transaction associated with the application corresponds to a sequence of operations performed on the corresponding DBS. The sequence of operations correspond to (i) a read operation, and (ii) a write operation. Each primary key corresponds to a numeric value. The record correspond to one or more attributes. The update correspond to at least one change in the one or more attributes.

In an embodiment, the incoming transaction associated with the application is routed to a failover database server determined by a predefined logic, if at least one corresponding DBS is unavailable to accept traffic.

In an embodiment, the GPMV correspond to the score assigned to each potential route based on the geographical proximity. In an embodiment, the database server A receives a higher GPMV, if the database server A is closer to a destination than the database server B. In an embodiment, the SIPAV correspond to the sender internet protocol (IP) which includes an affinity value associated with each DBS. In an embodiment, the traffic of each client is routed to closest available DBS based on proximity of the sender IP of each client to the identified closest available DBS.

In an embodiment, the primary key (p) is generated by the call sequence object for the next value which returns the sequence (V) of the identified database (DB). The site identifier (Site_ID) is assigned to the identified DBS. The identified DBS includes the sequence incrementor object. The next value (NextVal) is obtained from a sequence (V) of the identified database (DB) incrementing by n. The next incremented value is to be returned as $1+n$ and $1+2n$. The 'n' correspond to number of sites.

In an embodiment, the incoming transaction is updated based on the primary key for which a candidate primary key identified for update associated with the incoming transaction is extracted as Vx. In an embodiment, the originating database server (a route_site_ID) is determined by the candidate primary key and a modulo function n. The update from the incoming transaction is routed to the originated database server from the client.

In an embodiment, the incoming transaction is updated based on the non-primary key. The framework to accept non-primary key update Structured Query Language is created. Another select query is executed on the local database server DBSn, to select one or more potential primary keys to be updated. The modulo function is executed on all selected one or more potential primary keys to obtain the resultant Route_Site_IDs. The transaction is routed to respective Route_Site_ID and executing an update statement on respective DBS.

In an embodiment, the conflict associated with the parent and the child association of at least one data manipulation language (DML) operation is dynamically monitored. The integrity Foreign key Constraint error on the DML operation is inserted on the identified database server (DBS) is checked. The primary key of a parent record (Ppk) is determined and associated Re-Route Site ID is calculated. The transaction is rerouted to the database server (DBSr). The new PK for a child table is calculated. The insert on the DBSr is executed with new PK.

In an embodiment, if the one or more new database server is to be added. The downtime is obtained to record the global system change number with the timestamp (T_Add) which are relayed to one or more database servers. The Site_Id n+1 is assigned to the new database server DBSn+1 and incremented by value to generate the primary key, thereby changes to n+1. The timestamp(T_U) of record is monitored to be updated pre update present in the database server.

In another aspect, there is provided a system for replication of data across one or more database servers (DBS) by interacting with a N-way Multimaster database replication framework. The system includes a memory storing instructions; one or more communication interfaces; and one or more hardware processors coupled to the memory via the one or more communication interfaces, wherein the one or more hardware processors are configured by the instructions to: route, by a transaction router, at least one incoming transaction associated with an application to at least one corresponding database server (DBS) by implementing a logic that integrates a geographical proximity mean value (GPMV) and a sender internet protocol (IP) affinity value (SIPAV); process, one or more incoming transaction to extract one or more data manipulation language (DML) operations written directly by the application using a change data capture mechanism from a database and replicated to each DBS other than a DBS on which the application is directly applying a data through one or more incoming transactions; generate, a primary key by allocating at least one unique identifier if the at least one data manipulation language (DML) operation is inserted on an identified database server (DBS); update, at least one primary key of a record from the incoming transaction; and dynamically monitor, if there is a conflict associated with a parent and a child association of at least one data manipulation language (DML) operation based on an integrity Foreign key Constraint error obtained by processing at least one inserted primary key on the record from the incoming transaction. The incoming transaction associated with the application corresponds to a sequence of operations performed on the corresponding DBS. The sequence of operations correspond to (i) a read operation, and (ii) a write operation. Each primary key corresponds to a numeric value. The record correspond to one or more attributes. The update correspond to at least one change in the one or more attributes.

In an embodiment, the incoming transaction associated with the application is routed to a failover database server determined by a predefined logic, if at least one corresponding DBS is unavailable to accept traffic.

In an embodiment, the GPMV correspond to the score assigned to each potential route based on the geographical proximity. In an embodiment, the database server A receives a higher GPMV, if the database server A is closer to a destination than the database server B. In an embodiment, the SIPAV correspond to the sender internet protocol (IP) which includes an affinity value associated with each DBS. In an embodiment, the traffic of each client is routed to closest available DBS based on proximity of the sender IP of each client to the identified closest available DBS.

In an embodiment, the primary key (p) is generated by the call sequence object for the next value which returns the sequence (V) of the identified database (DB). The site identifier (Site_ID) is assigned to the identified DBS. The identified DBS includes the sequence incrementor object.

The next value (NextVal) is obtained from a sequence (V) of the identified database (DB) incrementing by n. The next incremented value is to be returned as 1+n and 1+2n. The 'n' correspond to number of sites.

In an embodiment, the incoming transaction is updated based on the primary key for which a candidate primary key identified for update associated with the incoming transaction is extracted as Vx. In an embodiment, the originating database server (a route_site_ID) is determined by the candidate primary key and a modulo function n. The update from the incoming transaction is routed to the originated database server from the client.

In an embodiment, the incoming transaction is updated based on the non-primary key. The framework to accept non-primary key update Structured Query Language is created. Another select query is executed on the local database server DBSn, to select one or more potential primary keys to be updated. The modulo function is executed on all selected one or more potential primary keys to obtain the resultant Route_Site_IDs. The transaction is routed to respective Route_Site_ID and executing an update statement on respective DBS.

In an embodiment, the conflict associated with the parent and the child association of at least one data manipulation language (DML) operation is dynamically monitored. The integrity Foreign key Constraint error on the DML operation is inserted on the identified database server (DBS) is checked. The primary key of a parent record (Ppk) is determined and associated Re-Route Site ID is calculated. The transaction is rerouted to the database server (DBSr). The new PK for a child table is calculated. The insert on the DBSr is executed with new PK.

In an embodiment, if the one or more new database server is to be added. The downtime is obtained to record the global system change number with the timestamp (T_Add) which are relayed to one or more database servers. The Site_Id n+1 is assigned to the new database server DBSn+1 and incremented by value to generate the primary key, thereby changes to n+1. The timestamp(T_U) of record is monitored to be updated pre update present in the database server.

In yet another aspect, a non-transitory computer readable medium for comprising one or more instructions which when executed by one or more hardware processors causes at least one of: routing, by a transaction router, at least one incoming transaction associated with an application to at least one corresponding database server (DBS) by implementing a logic that integrates a geographical proximity mean value (GPMV) and a sender internet protocol (IP) affinity value (SIPAV); processing, one or more incoming transaction to extract one or more data manipulation language (DML) operations written directly by the application using a change data capture mechanism from a database and replicated to each DBS other than a DBS on which the application is directly applying a data through one or more incoming transactions; generating, a primary key by allocating at least one unique identifier if the at least one data manipulation language (DML) operation is inserted on an identified database server (DBS); updating, at least one primary key of a record from the incoming transaction; and dynamically monitoring, if there is a conflict associated with a parent and a child association of at least one data manipulation language (DML) operation based on an integrity Foreign key Constraint error obtained by processing at least one inserted primary key on the record from the incoming transaction. The incoming transaction associated with the application corresponds to a sequence of operations performed on the corresponding DBS. The sequence of operations correspond to (i) a read operation, and (ii) a write operation. Each primary key corresponds to a numeric value. The record correspond to one or more attributes. The update correspond to at least one change in the one or more attributes.

In an embodiment, the incoming transaction associated with the application is routed to a failover database server determined by a predefined logic, if at least one corresponding DBS is unavailable to accept traffic.

In an embodiment, the GPMV correspond to the score assigned to each potential route based on the geographical proximity. In an embodiment, the database server A receives a higher GPMV, if the database server A is closer to a destination than the database server B. In an embodiment, the SIPAV correspond to the sender internet protocol (IP) which includes an affinity value associated with each DBS. In an embodiment, the traffic of each client is routed to closest available DBS based on proximity of the sender IP of each client to the identified closest available DBS.

In an embodiment, the primary key (p) is generated by the call sequence object for the next value which returns the sequence (V) of the identified database (DB). The site identifier (Site_ID) is assigned to the identified DBS. The identified DBS includes the sequence incrementor object. The next value (NextVal) is obtained from a sequence (V) of the identified database (DB) incrementing by n. The next incremented value is to be returned as $1+n$ and $1+2n$. The 'n' correspond to number of sites.

In an embodiment, the incoming transaction is updated based on the primary key for which a candidate primary key identified for update associated with the incoming transaction is extracted as Vx. In an embodiment, the originating database server (a route_site_ID) is determined by the candidate primary key and a modulo function n. The update from the incoming transaction is routed to the originated database server from the client.

In an embodiment, the incoming transaction is updated based on the non-primary key. The framework to accept non-primary key update Structured Query Language is created. Another select query is executed on the local database server DBSn, to select one or more potential primary keys to be updated. The modulo function is executed on all selected one or more potential primary keys to obtain the resultant Route_Site_IDs. The transaction is routed to respective Route_Site_ID and executing an update statement on respective DBS.

In an embodiment, the conflict associated with the parent and the child association of at least one data manipulation language (DML) operation is dynamically monitored. The integrity Foreign key Constraint error on the DML operation is inserted on the identified database server (DBS) is checked. The primary key of a parent record (Ppk) is determined and associated Re-Route Site ID is calculated. The transaction is rerouted to the database server (DBSr). The new PK for a child table is calculated. The insert on the DBSr is executed with new PK.

In an embodiment, if the one or more new database server is to be added. The downtime is obtained to record the global system change number with the timestamp (T_Add) which are relayed to one or more database servers. The Site_Id n+1 is assigned to the new database server DBSn+1 and incremented by value to generate the primary key, thereby changes to n+1. The timestamp(T_U) of record is monitored to be updated pre update present in the database server.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 8 is an exemplary flow diagram illustrating method of replicating the data across the one or more database servers (DBS) by interacting with the N-way Multimaster database replication framework, according to an embodiment of the present disclosure.

DETAILED DESCRIPTION

Figure 1:
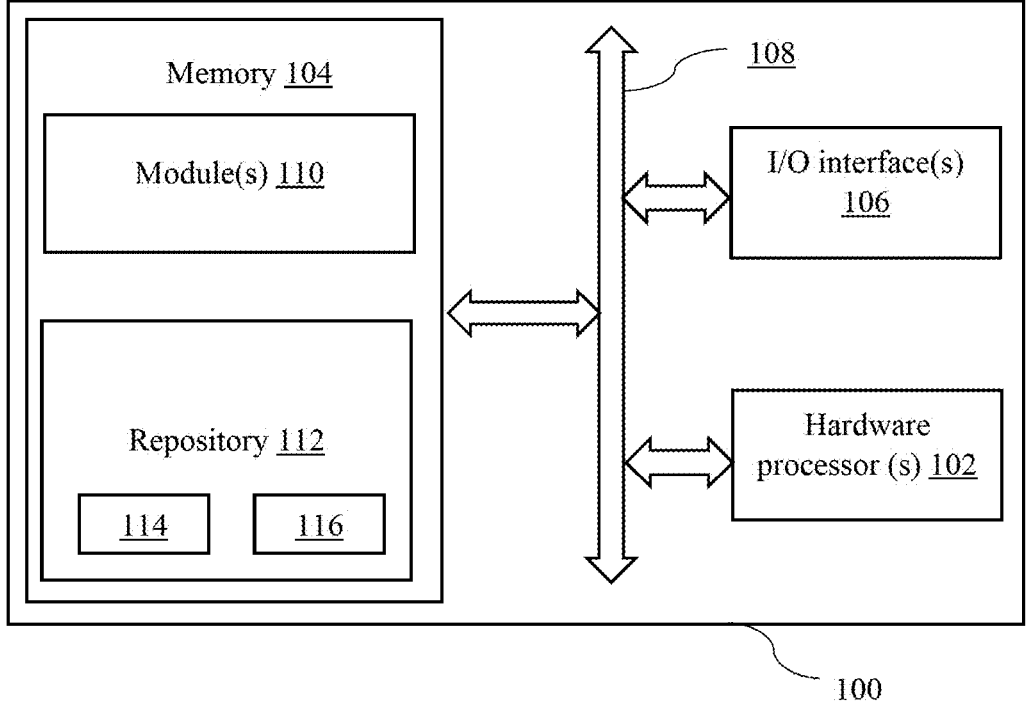
FIG. 1 illustrates a system for replication of data in a distributed computing environment, according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

There is a need for an effective approach to address critical problem associated with a distributed data management. Embodiments of the present disclosure provide systems that execute an interaction of a N-way Multimaster database replication framework with one or more database servers (DBS) for replication of a data.

Referring now to the drawings, and more particularly to FIGS. 1 through 8, where similar reference characters denote corresponding features consistently throughout the figures, there are shown preferred embodiments, and these embodiments are described in the context of the following exemplary system and/or method.

FIG. 1 illustrates a system 100 for replication of data in a distributed computing environment, according to an embodiment of the present disclosure. In an embodiment, the system 100 includes one or more processor(s) 102, communication interface device(s) or input/output (I/O) interface(s) 106, and one or more data storage devices or memory 104 operatively coupled to the one or more processors 102. The memory 104 includes a database. The one or more processor(s) processor 102, the memory 104, and the I/O interface(s) 106 may be coupled by a system bus such as a system bus 108 or a similar mechanism. The one or more processor(s) 102 that are hardware processors can be implemented as one or more microprocessors, microcomputers, microcontrollers, digital signal processors, central processing units, state machines, logic circuitries, and/or any devices that manipulate signals based on operational instructions. Among other capabilities, the one or more processor (s) 102 is configured to fetch and execute computer-readable instructions stored in the memory 104. In an embodiment, the system 100 can be implemented in a variety of computing systems, such as laptop computers, notebooks, handheld devices, workstations, mainframe computers, a network cloud, and the like.

The I/O interface device(s) 106 can include a variety of software and hardware interfaces, for example, a web interface, a graphical user interface, and the like. The I/O interface device(s) 106 may include a variety of software and hardware interfaces, for example, interfaces for peripheral device(s), such as a keyboard, a mouse, an external memory, a camera device, and a printer. Further, the I/O interface device(s) 106 may enable the system 100 to communicate with other devices, such as external databases. The I/O interface device(s) 106 can facilitate multiple communications within a wide variety of networks and protocol types, including wired networks, for example, local area network (LAN), cable, etc., and wireless networks, such as Wireless LAN (WLAN), cellular, or satellite. In an embodiment, the I/O interface device(s) 106 can include one or more ports for connecting a number of devices to one another.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 110 and a repository 112 for storing data processed, received, and generated by the plurality of modules 110. The plurality of modules 110 may include routines, programs, objects, components, data structures, and so on, which perform particular tasks or implement particular abstract data types.

Further, the database stores information pertaining to inputs fed to the system 100 and/or outputs generated by the system (e.g., data/output generated at each stage of the data processing) 100, specific to the methodology described herein. More specifically, the database stores information being processed at each step of the proposed methodology.

Additionally, the plurality of modules 110 may include programs or coded instructions that supplement applications and functions of the system 100. The repository 112, amongst other things, includes a system database 114 and other data 116. The other data 116 may include data generated as a result of the execution of one or more modules in the plurality of modules 110. Herein, the memory for example the memory 104 and the computer program code configured to, with the hardware processor for example the processor 102, causes the system 100 to perform various functions described herein under.

Figure 2A:
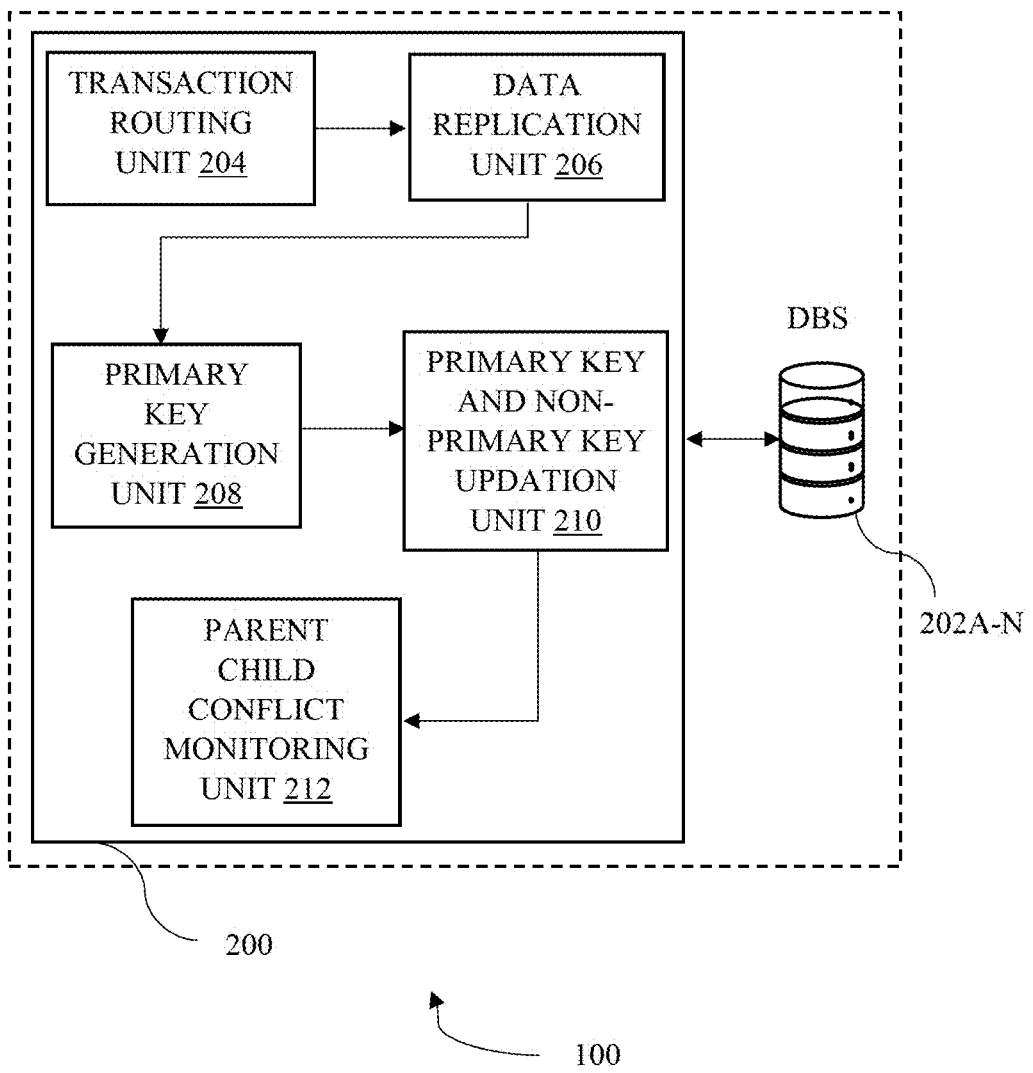
FIG. 2A is an exemplary functional diagram of the system of FIG. 1 executing an interaction of a N-way Multimaster database replication framework with one or more database servers (DBS) for replication of the data, according to an embodiment of the present disclosure.
Figure 2B:
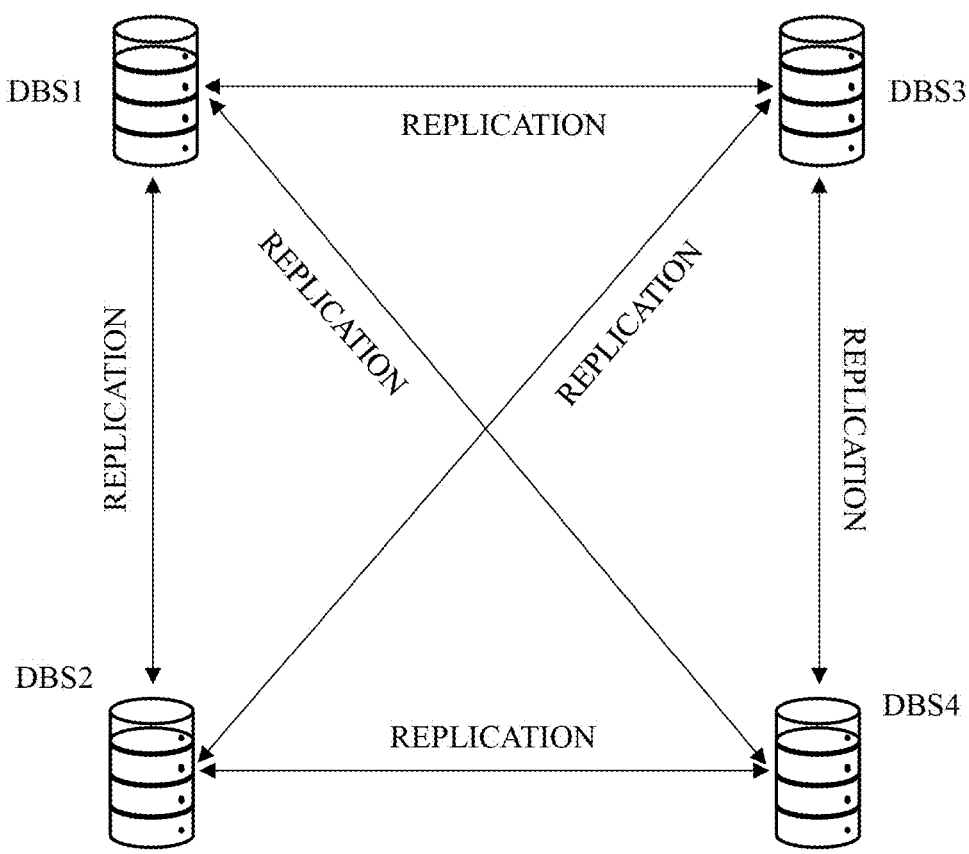
FIG. 2B is an exemplary functional diagram of one or more database servers (DBS) for replication of the data, according to an embodiment of the present disclosure.

FIG. 2A is an exemplary functional diagram of the system 100 of FIG. 1 executing an interaction of a N-way Multimaster database replication framework 200 with one or more database servers (DBS) 202A-N for replication of the data, according to an embodiment of the present disclosure. FIG. 2B is an exemplary functional diagram of one or more database servers (DBS) 202A-N for replication of the data, according to an embodiment of the present disclosure. The system 100 includes the N-way Multimaster database replication framework 200 which interacts with the one or more database servers (DBS) 202A-N for replication of the data. The N-way Multimaster database replication framework 200 includes a transaction routing unit 204, a data replication unit 206, a primary key generation unit 208, a primary key and a non-primary key updation unit 210, and a parent child conflict monitoring unit 212.

Figure 3:
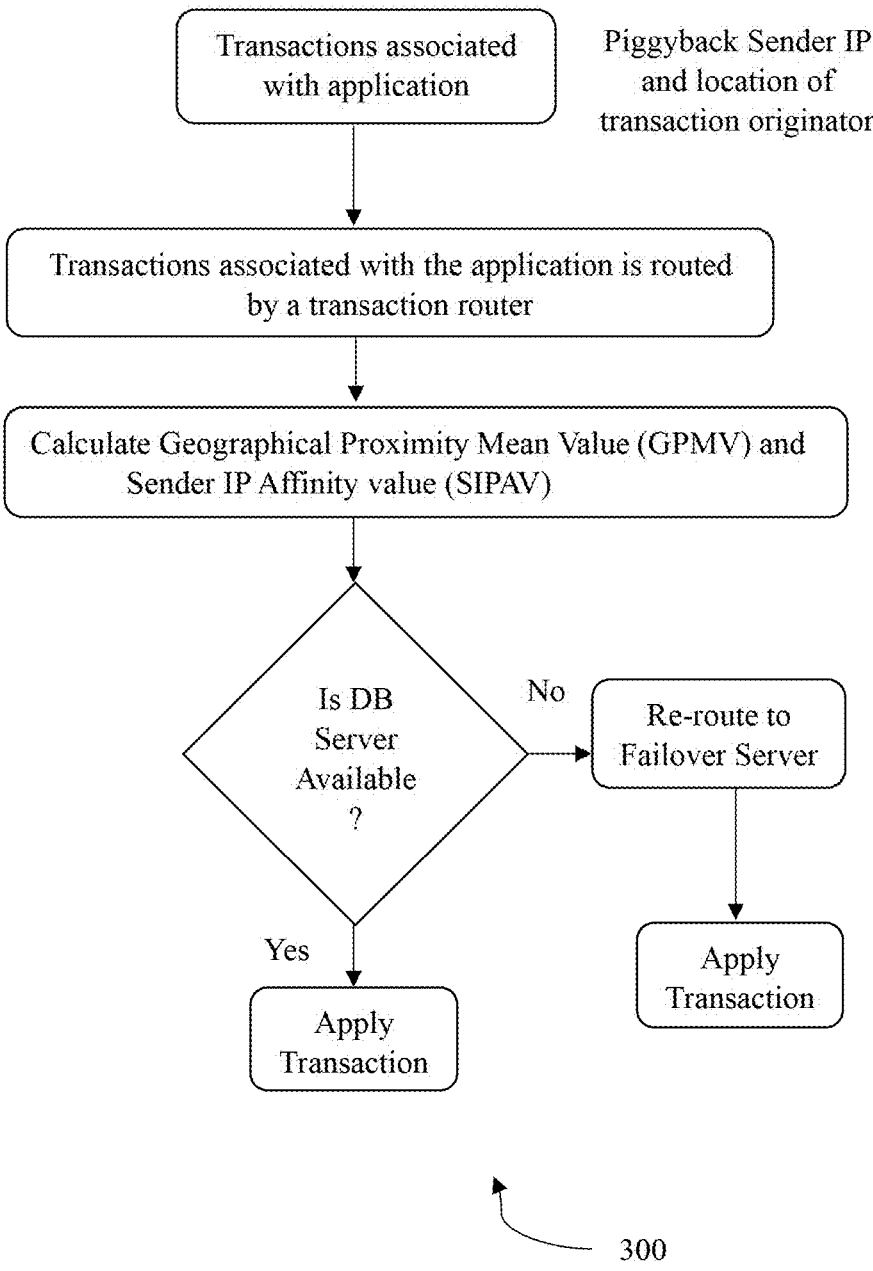
FIG. 3 is an exemplary flow diagram illustrating a method of routing each incoming transaction associated with the application by the transaction router to corresponding database server (DBS), according to an embodiment of the present disclosure.

FIG. 3 is an exemplary flow diagram illustrating a method 300 of routing each incoming transaction associated with the application by the transaction router to corresponding database server (DBS) from one or more database server (DBS) 202A-N, according to an embodiment of the present disclosure. The transaction routing unit 204 includes a transaction router (not shown in FIGURE) which routes one or more incoming transactions associated with an application to corresponding database server (DBS) from the one or more database server (DBS) 202A-N by implementing a logic that integrates a geographical proximity mean value (GPMV) and a sender internet protocol (IP) affinity value (SIPAV). The application correspond to but is not limited to a retail, health care, and overarching applications. The one or more incoming transactions associated with the application corresponds to a sequence of operations performed on a DBS from the one or more database server (DBS) 202A-N. The sequence of operations corresponds to but is not limited to (i) a read operation, and (ii) a write operation.

The geographical proximity mean value (GPMV) is a score assigned to each potential route based on a geographical proximity. In an embodiment, if the database server A is closer to a destination than a database server B, then the database server A receives the GPMV as a higher. For example, if DBS-1 is 456 miles away from the Sender and DBS-2 is 740 miles away, DBS-A gets a higher GPMV Value. For example, in case of internal traffic GPMV would be consistent, then considering a retail application that is deployed at physical stores, traffic originating from stores have consistent GPMV for a store. Hence, each transaction from each store are routed to a constant DB server if all servers are healthy. The SIPAV corresponds to a sender internet protocol (IP) which includes an affinity value associated with each DBS, and a traffic of each client is routed to a closest available DBS based on proximity of the sender IP of each client to the identified closest available DBS.

In an embodiment, the one or more incoming transactions associated with the application is routed to a failover database server determined by a predefined logic if corresponding database server from the one or more database server 202A-N is unavailable to accept traffic. In an embodiment, all DBS are assigned a value based on corresponding geographical proximity to each other from east to west longitudinally. Each DB server acts as a failover next in the list assuring geographical proximity of transactions, in case of failover except $N^{th}$ DB server. For example, the $N^{th}$ DB server is a failover to DB server $N-1^{th}$. The predefined logic is mentioned as in Table 1:

TABLE 1

| SITE | DATABASE SERVERS | FAILOVER DATABASE SERVERS |
|------|------------------|---------------------------|
| US East | DBS1 | DBS2 |
| US East2 | DBS2 | DBS3 |
| US Central | DBS3 | DBS4 |
| US West | DBS4 | DBS3 |

The data replication unit 206 process the one or more incoming transactions to extract one or more data manipulation language (DML) operations which is directly written by the application using a change data capture mechanism from a database and replicated to each DBS other than the DBS on which the application is directly applying a data through the one or more incoming transactions. Any data manipulation transaction written onto any database server in the N-way Multimaster needs to be replicated all the other databases. In an embodiment, the change data capture mechanism corresponds to the data get replicated to the DBS 2, the DBS 3 and the DBS 4 from DBS 1 and does not get looped back to DBS1 again. The exemplary set up of a 4-way Multimaster is as mentioned in table 2:

TABLE 2

| DATABASE SERVERS | DATA TO BE REPLICATED TO |
|------------------|--------------------------|
| DBS1 | DBS2, DBS3, DBS4 |
| DBS2 | DBS1, DBS3, DBS4 |
| DBS3 | DBS1, DBS2, DBS4 |
| DBS4 | DBS1, DBS2, DBS3 |

The 4-way Multimaster includes auditing column in each table referred as "data_updated_path". The auditing column includes one or more domain values "Application" and "Replication". In case of any DML operation, the auditing column is set, application transaction are set as "Application". For extracting data out from database, all rows are excluded for which "data_updated_path" is set as "Replication". For instance, considering Oracle® Relational Database Management System (RDBMS) as an example, and use golden gate as replication tool, any transaction happening on DBS1 via the application are extracted and transactions which are received from other databases needs to be excluded from extraction. An exclusion (i.e., tag exclusion) are used to prevent data applied by replication to be extracted. Any transaction applied application are applied to DBS using application user (i.e., App user) and no tag, whereas replication process applies using golden gate DBS user (e.g., rep_user) and distinct tag, which uses same tag as server name to incoming transactions. For example, using tag 1 incoming transaction may receive from DBS2, DBS3, DBS4 respectively. In extract process configuration, excluding the user's rep_user and tag 1 from extraction.

Figure 4:
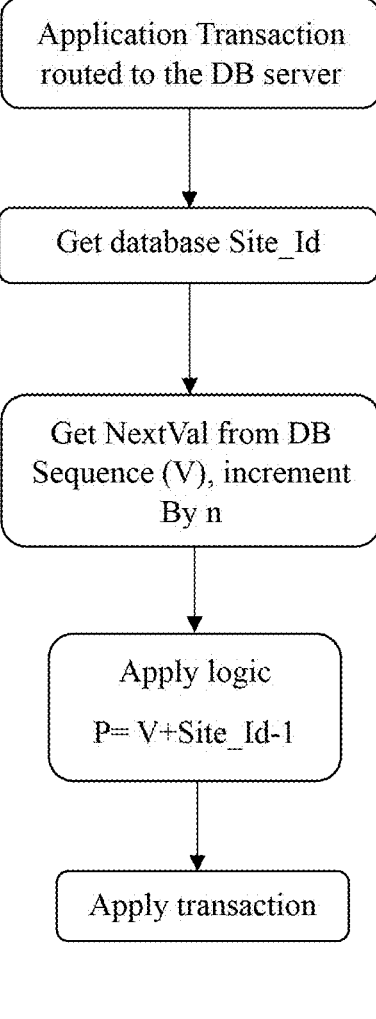
FIG. 4 is an exemplary flow diagram illustrating a method of generating the primary key, according to an embodiment of the present disclosure.

The primary key generation unit 208 generates a primary key by allocating an unique identifier if the one or more DML operations are inserted on an identified database server (DBS) from the one or more database servers (DBS) 202A-N. Each primary key corresponds to a numeric value. FIG. 4 is an exemplary flow diagram illustrating a method 400 of generating the primary key, according to an embodiment of the present disclosure. Each identified DBS includes a sequence incrementer object which start with 1. Next incremented value (i.e. by n) is to be returned 1+n (n being number of sites) and 1+2n. Each database is assigned a site id (i.e., Site_id) to the identified DBS, starting from 1 . . . n. If the one or more DML operations are inserted on the one or more database servers (DBS) 202A-N, algorithm calls sequence object for next value, suppose returns a value V, then algorithm assigns a primary key value p=V+Site_id-1. For example, inserting the DML write operation data onto SITE 3 (i.e., Site_Id=3, DBS3) and sequence_object returns 16. The illustration in 4-way Multimaster is as mentioned in table 3:

TABLE 3

| Next_value(V) | DBS1 | DBS2 | DBS3 | DBS4 |
|---------------|------|------|------|------|
| 1 | 1 | 2 | 3 | 4 |
| 5 | 5 | 6 | 7 | 8 |
| 9 | 9 | 10 | 11 | 12 |
| 13 | 13 | 14 | 15 | 16 |

Figure 5A:
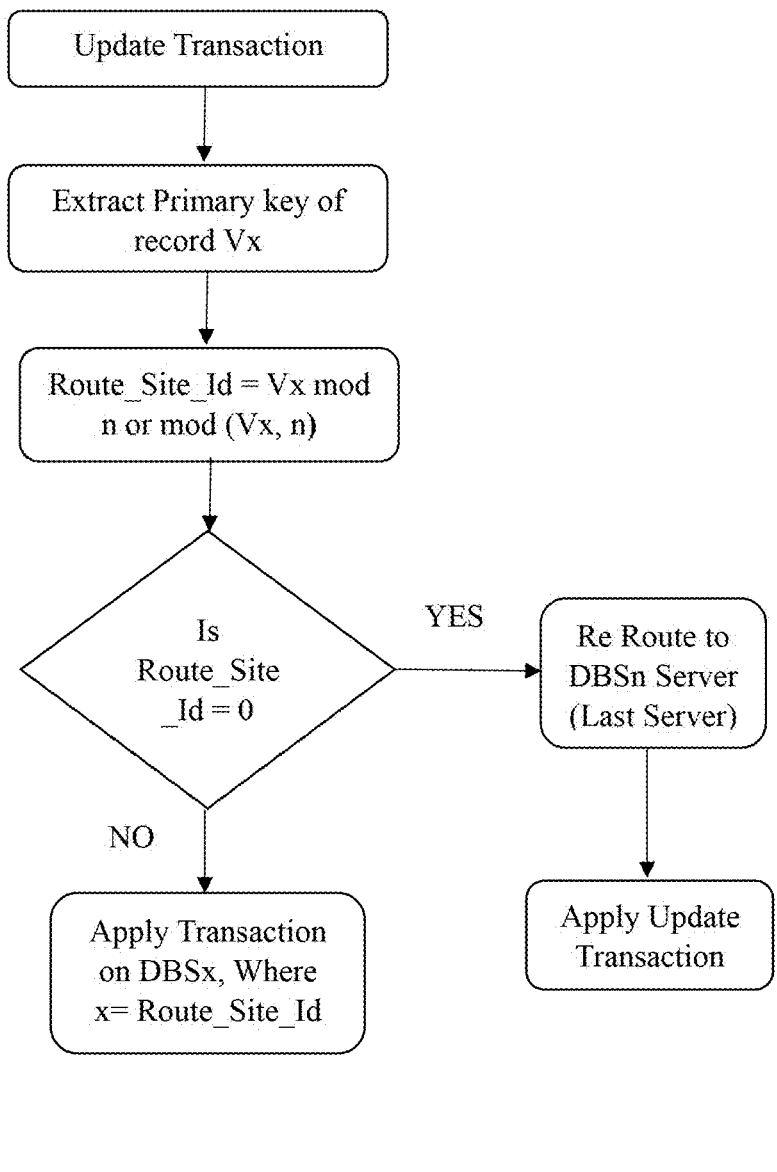
FIG. 5A is an exemplary flow diagram illustrating a method of updating the incoming transaction based on the primary key, according to an embodiment of the present disclosure.

The primary key and a non-primary key updation unit 210 detect the primary key of a record to be updated from the one or more transactions associated with the application. The record corresponds to one or more attributes. If there is a change in one or more attributes then the record is updated. In an embodiment, an application server routes the update in the transaction to the DBS from where the record is first inserted. FIG. 5A is an exemplary flow diagram illustrating a method 500 of updating the incoming transaction based on the primary key, according to an embodiment of the present disclosure. Consider, a candidate primary key identified for update associated with the incoming transaction is as Vx. To determine a originating database server (DBS):

$$Route\_Site\_Id = Vx \bmod n \text{ or } \bmod (Vx, n)$$

The update associated with the incoming transaction is routed to the originated database server (DBS) Route_Site_Id and if Route_Site_Id is 0 then route to last site database server DBSn. The illustration in 4-way Multimaster is as mentioned in table 4:

TABLE 4

| Next_value (V) | DBS1 | Mod (Vx, n) | DBS2 | Mod (Vx, n) | DBS3 | Mod (Vx, n) | DBS4 | Mod (Vx, n) |
|---|---|---|---|---|---|---|---|---|
| 1 | 1 | 1 | 2 | 2 | 3 | 3 | 4 | 0 |
| 5 | 5 | 1 | 6 | 2 | 7 | 3 | 8 | 0 |
| 9 | 9 | 1 | 10 | 2 | 11 | 3 | 12 | 0 |
| 13 | 13 | 1 | 14 | 2 | 15 | 3 | 16 | 0 |

Figure 5B:
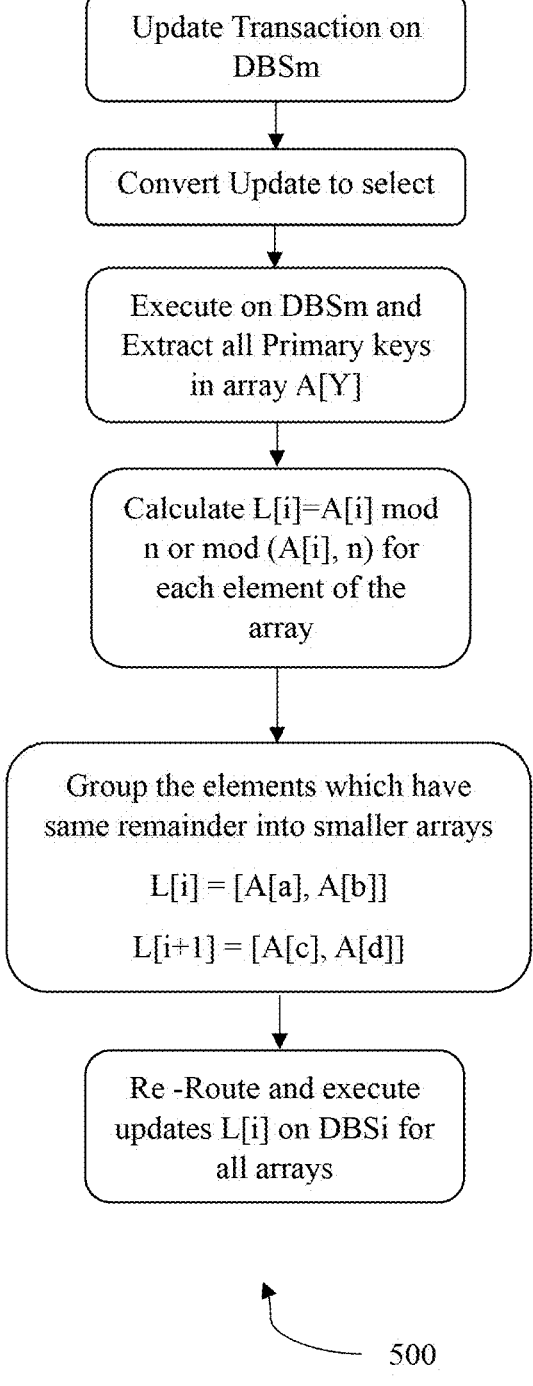
FIG. 5B is an exemplary flow diagram illustrating a method of updating the incoming transaction based on the non-primary key, according to an embodiment of the present disclosure.

FIG. 5B is an exemplary flow diagram illustrating a method 500 of updating the incoming transaction based on the non-primary key, according to an embodiment of the present disclosure. If the update query are being executed on a column other than primary key then there is possibility the resultant might update more than one record in the DBS 202A-N. In order to avoid conflicts following transaction routing algorithm are adhered. The steps involved in updation of non-primary key are: (a) a framework is written to accept non-primary key update Structured Query Language (SQLs), (b) an another select query is run on a local database server DBSn, to select one or more potential primary keys to be updated, (c) a modulo function is executed on all selected one or more potential primary keys to obtain a resultant Route_Site_Ids i.e., L[i]=A[i] mod n or mod (A[i], n) is calculated for each element of the array, (d) the elements which have same remainder are grouped into smaller arrays i.e., L[i]=[A[a], A[b]] and L[i+1]=[A[c], A[d]], and (e) a transaction is routed to respective Route_Site_Ids and execute the update statement i.e., L[i] on DBSi for all arrays. For example, an illustration of algorithm in 4-way Multimaster is depicted: Consider, an update query landed in the DBS3, if output of the step 2 is primary key values i.e., 1, 6, 10, then step 3 returns Route_Site_Id=1 for Primary key 1, and Route_Site_Id=2 for primary keys as (6, 10). An update statement of DBS1 is executed for Primary Key 1, and an update statement on DBS2 is executed for Primary Key in 6,10.

Figure 6:
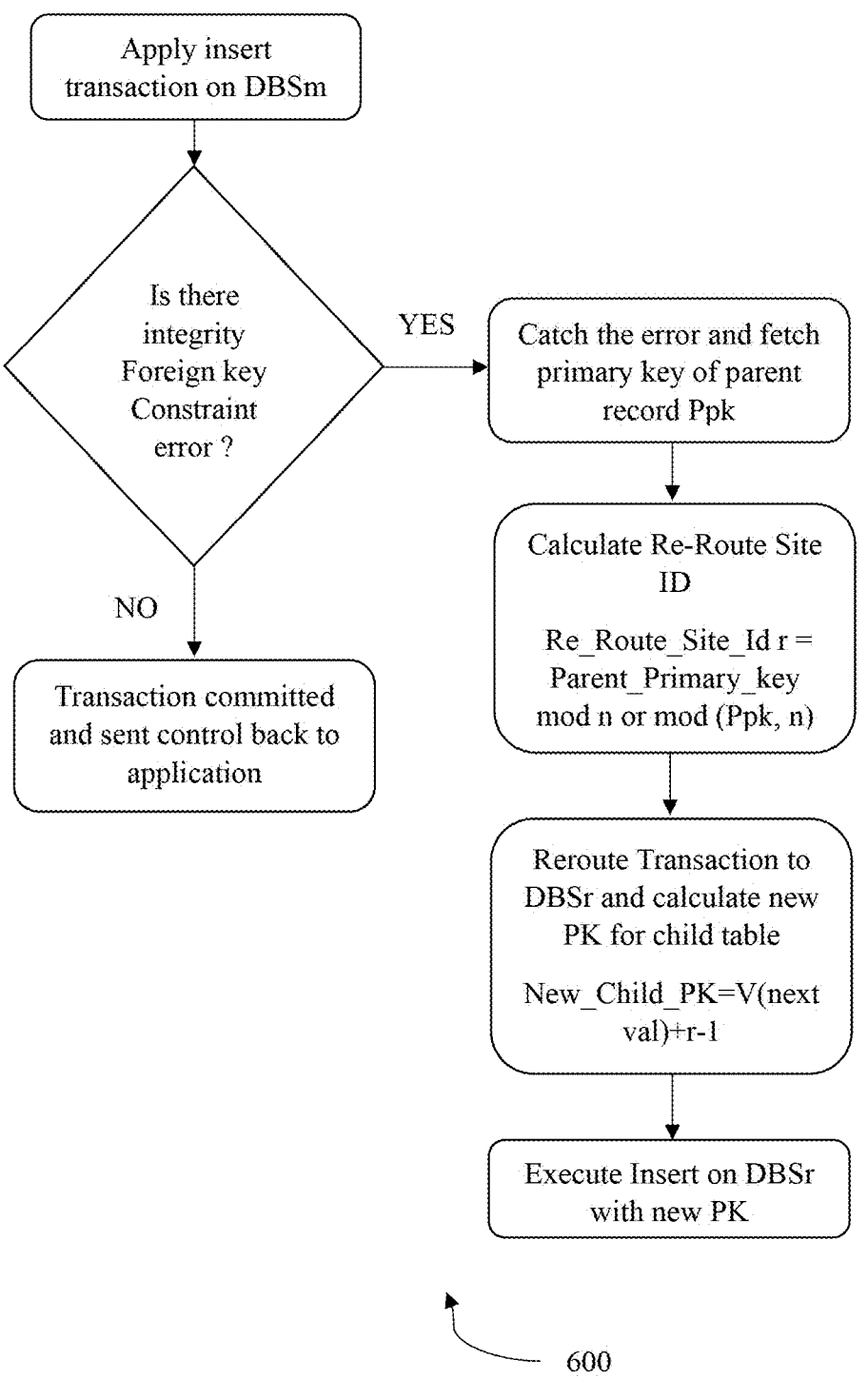
FIG. 6 is an exemplary flow diagram illustrating a method of monitoring one or more conflicts associated with the parent and the child association of one or more data manipulation language (DML) operations, according to an embodiment of the present disclosure.
Figures 7A, 7B:
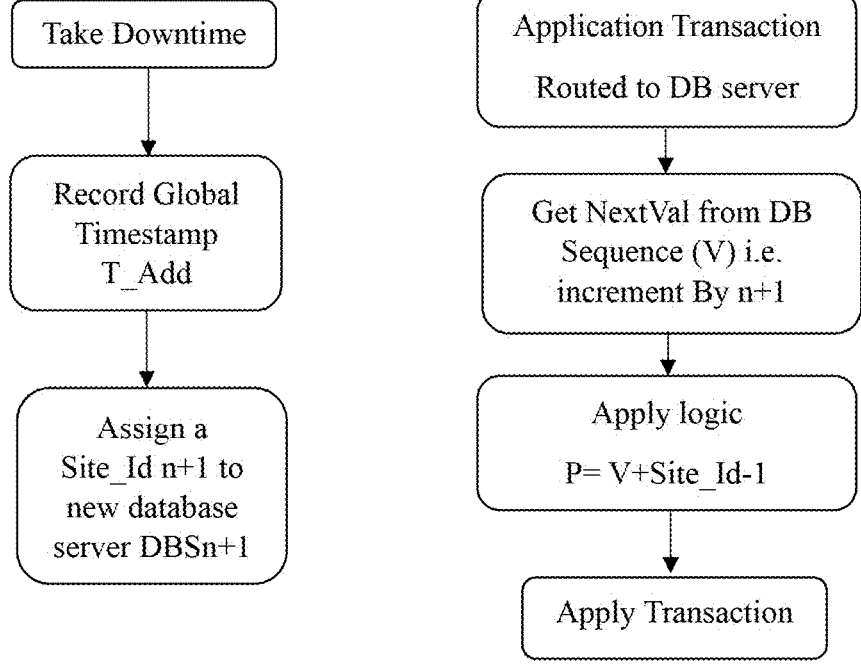
FIG. 7A through FIG. 7D are exemplary flow diagrams illustrating a method of adding one or more new database server (DBS) to existing set of database server (DBS) architecture, according to an embodiment of the present disclosure.
Figures 7C, 7D:
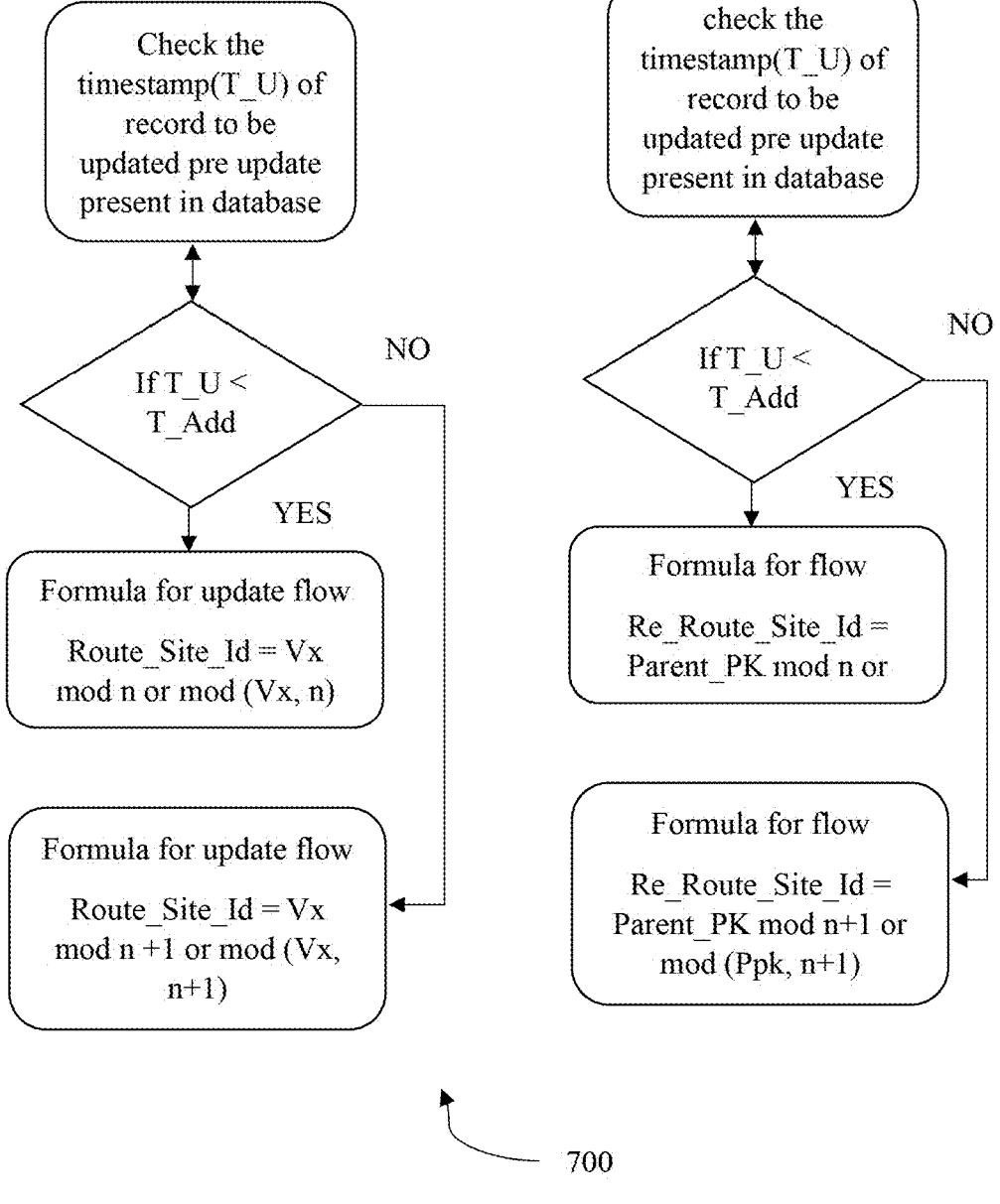

The parent child conflict monitoring unit 212 dynamically monitors if there is a conflict associated with a parent and a child association of the one or more data manipulation language (DML) operations based on an integrity Foreign key Constraint error obtained by processing the inserted primary key on the record from the incoming transaction. FIG. 6 is an exemplary flow diagram illustrating a method 600 of monitoring one or more conflicts associated with the parent and the child association of the one or more data manipulation language (DML) operations, according to an embodiment of the present disclosure. In the N-way Multi-master setup where a parent is inserted from one database, and corresponding child from another, then parent-child is handled and rerouting of the child update. For example, consider 4-way Multimaster, the steps involved are:

a. Suppose, there are two tables employee and employee_address.

b. Employee data is inserted from the database server 1 (DBS1) at 10:54 PM (Employee: Employee_Id=109, Employee_Name "John", Employee_Last_Updated_Date="xxxx 10:54 PM").

c. Suppose replication lag between DBS1 and DBS3 is 3 minutes, while the transaction is inflight between DBS1 and DBS3. Employee record hasn't arrived at DBS3. An insert is received for same Employee_Address at DBS3 (Employee_Address: Employee_Address_Id=111, Employee_Id=109, Employee_Address="XXXYY UUJU", Employee_Last_Updated_Date="xxxx 10:55 PM")

d. After applying the insert of DBS3 "Parent Key Not Found" integrity constraint error is received.

e. The application catch that exception, and in catch block, the application fetches the parent primary key (i.e. Employee_Id=109) and execute a custom algorithm to identify Rerouting Database server on which child insert are re-executed.

Re_Route_Site_Id=Parent_Primary_key mod n or mod (Ppk, n), In this example, Re_Route_Site_Id=109 mod 4 or mod (109,4)=1 f. Hence, Child update would be routed to DBS1, and new primary is generated via customized algorithm New_Employee_Address_Id=V (NextVal)+Site_id-1 (e.g., 117).

g. New Child record are inserted on DBS1 (Employee_Address: Employee_Address_Id=117, Employee_Id=109, Employee_Address="XXXYY UUJU", Employee_Last_Updated_Date="xxxx 10:55 PM") successfully and control would be returned to application after commit.

h. The record follows the parent record through replication and alleviate any parent child anomaly.

In a distributed architecture an addition of one or more new database servers to existing set up is necessary to facilitate scalability. FIG. 7A through FIG. 7D are exemplary flow diagrams illustrating a method 700 of adding one or more new database server (DBS) to existing set of database server (DBS) architecture, according to an embodiment of the present disclosure. For example, in the N-way Multimaster i.e., considering 4-way Multimaster, the steps involved are:

a. A downtime is taken, and system is brought to a halt position.

b. A global system change number (i.e., if any RDBMS records) or a timestamp (T_Add) is recorded and relay to all database servers.

c. The timestamp (T_Add) is cached in all application servers.

d. A Site_Id n+1 is assigned to a new database server DBSn+1.

e. A value is incremented for primary key generation which change to n+1.

f. A check is performed on the timestamp(T_U) of record to be updated against pre-update which is present in the database:

i. If T_U<T_Add then Route_Site_Id=Vx mod n or mod (Vx, n) to determine the original database server from where record got inserted.

ii. else if, T_U>T_Add then then Route_Site_Id=Vx mod n+1 or mod (Vx, n+1)

g. A check is performed on the timestamp(T_U) of record to be updated against pre-update which is present in the database:

i. If T_U<T_Add then Re_Route_Site_Id=Parent_Primary_key mod n or mod (Ppk, n) to determine the original database server from where parent record got inserted ii. else if, T_U>T_Add then then Re_Route_Site_Id=Parent_Primary_key mod n+1 or mod (Ppk, n+1)

Figure 2B:

FIG. 8 is an exemplary flow diagram illustrating method 800 of replicating the data across the one or more database servers (DBS) 202A-N by interacting with the N-way Multimaster database replication framework 200, according to an embodiment of the present disclosure. In an embodiment, the system 100 comprises one or more data storage devices or the memory 104 operatively coupled to the one or more hardware processors 102 and is configured to store instructions for execution of steps of the method by the one or more processors 102. The flow diagram depicted is better understood by way of following explanation/description. The steps of the method 800 of the present disclosure will now be explained with reference to the components of the system as depicted in FIG. 1 and FIG. 2.

At step 802, the incoming transaction associated with the application is routed by the transaction router to the corresponding database server (DBS) from the one or more database server (DBS) 202A-N by implementing the logic that integrates the geographical proximity mean value (GPMV) and the sender ip affinity value (SIPAV) (as described in corresponding description of FIG. 3). The GPMV correspond to the score assigned to each potential route based on the geographical proximity. The database server A receives a higher GPMV, if the database server A is closer to a destination than the database server B. The SIPAV correspond to the sender internet protocol (IP) which includes an affinity value associated with each DBS. The traffic of each client is routed to the closest available DBS based on proximity of the sender IP of each client to the identified closest available DBS. The incoming transaction associated with the application correspond to the sequence of operations performed on a DBS from the one or more database server (DBS) 202A-N. The sequence of operations correspond to (i) the read operation, and (ii) the write operation. The incoming transaction associated with the application is routed to a failover database server determined by a predefined logic if the corresponding DBS is unavailable to accept traffic.

At step 804, the incoming transaction is processed to extract the data manipulation language (DML) operation written directly by the application using the change data capture mechanism from a database and replicated to each DBS other than a DBS on which the application is directly applying a data through one or more incoming transactions.

At step 806, the primary key is generated (as described in corresponding description of FIG. 4) by allocating at least one unique identifier if the at least one data manipulation language (DML) operation is inserted on an identified database server (DBS) from the one or more DBS 202A-N. Each primary key corresponds to the numeric value. In an embodiment, the primary key (p) is generated by the call sequence object for the next value which returns the Sequence (V) of the identified database (DB). The site identifier (Site_ID) is assigned to the identified DBS. In an embodiment, the identified DBS includes the sequence incrementor object. The next value (NextVal) is obtained from a sequence (V) of the identified database (DB), incrementing by n. In an embodiment, the next incremented value is to be returned as 1+n and 1+2n. The 'n' correspond to number of sites.

At step 808, the primary key of the record from the incoming transaction is updated (as described in corresponding description of FIG. 5A and FIG. 5B). The record correspond to one or more attributes. The update correspond to one or more changes in the one or more attributes. In an embodiment a candidate primary key identified for update associated with the incoming transaction is extracted as Vx. In an embodiment, the originating database server (a route_site_ID) is determined by the candidate primary key and a modulo function n. The update associated the incoming transaction to the originated database server from the client. In an embodiment, the non-primary key is updated. The framework to accept non-primary key update Structured Query Language is created. Another select query is executed on the local database server DBSn, to select one or more potential primary keys to be updated. The modulo function is executed on all selected one or more potential primary keys to obtain the resultant Route_Site_IDs. The transaction is routed to respective Route_Site_ID and execute the update statement on respective DBS.

At step 810, the conflict associated with the parent and the child association of at least one data manipulation language (DML) operation is dynamically monitored (as described in corresponding description of FIG. 6) based on the integrity Foreign key Constraint error obtained by processing a inserted primary key on the record from the incoming transaction. In an embodiment, the conflict associated with the parent and the child is dynamically monitored. The integrity Foreign key Constraint error is checked on the DML write operation data which is to be inserted on the database server (DBSm). The primary key of a parent record (Ppk) is determined and associated Re-Route Site ID is calculated. The transaction is rerouted to the database server (DBSr). The new PK for a child table is calculated. The insert on the DBSr is executed with new PK.

In an embodiment, if the one or more new database servers are to be added (as described in corresponding description of FIG. 7A and FIG. 7B), then the downtime is obtained to record the global system change number with the timestamp (T_Add) which are relayed to one or more database servers. The Site_Id n+1 is assigned to the new database server DBSn+1 and incremented by value to generate the primary key, thereby performing changes to n+1. The timestamp(T_U) of record is monitored to be updated pre update present in the database server.

The embodiments of present disclosure herein address unresolved problem of conflict avoidance mechanisms, data inconsistency and integrity loss amidst concurrent updates during data replication in the distributed data management. The embodiment thus provides an interaction of the N-way Multimaster database replication framework with one or more database servers (DBS) for replication of the data. The N-way Multimaster database replication framework is designed to meet the intricate demands of contemporary distributed computing environments. The N-way Multimaster database replication framework through which data replication is performed across geographically dispersed nodes are entangled, ensuring instant synchronization of updates without compromising consistency. This eliminates the need for traditional conflict resolution mechanisms and their associated inconsistencies and data loss. The N-way Multimaster database replication framework facilitates simultaneous read and write operations across numerous database instances, fostering seamless real-time data synchronization. The ability to parallelize read and write operations, these databases enhance overall system performance, reducing latency and ensuring efficient data access for users across different locations. The architecture as described herein via figures and various embodiments ensures a robust solution for organizations requiring dynamic, multidirectional data sharing in modern, distributed database ecosystems. By allowing multiple nodes to independently process transactions, the n-way Multimaster databases enhance fault tolerance. In case of node failures, other nodes can continue operations, ensuring uninterrupted service and data availability.

The N-way Multimaster replication framework is capable of conflict resolution, consistency models, and scalability considerations, the abstract underscores the significance of effective data replication in enhancing the reliability and performance in diverse operational scenarios. In the N-way Multimaster databases, generating non-overlapping sequences is imperative for preventing conflicts and ensuring data consistency. The method of the present disclosure explores the intricacies of the n-way Multimaster database server and critical role of the data replication in ensuring robust and consistent information dissemination across distributed systems. The method of the present disclosure ensures no loopback of committed transactions to same database using minimum network bandwidth. The N-way Multimaster replication framework ensures that no data loss if one or more updates are received for records on two or more database servers within replication lag. The N-way Multimaster replication framework ensures real-time inventory management, order processing, and customer data synchronization across multiple locations or online platforms, and also ensures consistency in product availability and customer information. The N-way Multimaster replication framework support seamless transactions, account management, and customer interactions across multiple branches or digital channels. Instead of relying on a single central authority, these databases distribute control across multiple nodes. This decentralized approach enhances system robustness and minimizes the risk of a single point of failure.

The N-way Multimaster replication framework setups to synchronize patient records, treatment plans, and medical histories across different clinics, hospitals, or departments and ensures healthcare providers have access to the latest patient information. The N-way Multimaster replication framework helps in optimizing supply chain processes, reducing delays, and improving overall efficiency. The N-way Multimaster replication framework manages subscriber information, call records, and network configurations. The N-way Multimaster replication framework aids in optimizing the manufacturing processes. The N-way Multimaster replication framework assist in synchronizing information related to energy consumption, grid status, and maintenance schedules. The N-way Multimaster replication framework ensures accurate and timely delivery of goods. The N-way Multimaster replication framework supports efficient governance and service delivery. The N-way Multimaster replication framework for student information systems, course management, and collaborative research projects, ensuring seamless data access.

The transaction router acts as a traffic manager, contributing significantly to the reliability, optimizes resource utilization, enhances scalability, and ensures fault tolerance within the distributed system. The transaction router intelligently routes incoming transactions to appropriate database server, leveraging load balancing algorithms to evenly distribute the workload. The transaction router plays a key role in maintaining data consistency by directing transactions to the relevant database server responsible for data storage or processing. The primary key generation minimizes likelihood of overlaps, enhancing the overall integrity of distributed data in a complex, the N-way Multimaster environment. Non overlapping primary key generation across databases is key to avoid inserting anomalies while replicating the data. The primary key updation ensures zero update inflight conflicts. By preventing update conflicts, the system 100 ensures that modifications to data are orderly and do not contradict each other. This helps maintain a coherent and accurate representation of information across all nodes, preserving the overall integrity of the database. Scalability or addition of database server is handled via customized approach without compromising integrity of existing or to be created data. The N-way Multimaster databases address the challenges associated with managing data in distributed, dynamic, and geographically dispersed environments, providing businesses with a more resilient, scalable, and responsive infrastructure. The system 100 enables eradicating the complexity of in-flight data conflicts, guaranteeing data consistency without compromise during concurrent updates, and instilling unwavering reliability, thus enabling redefining of geographical distribution strategies to establish local access points, and enhancing user experience and supporting global operations with precision.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

routing, by a transaction router, at least one incoming transaction associated with an application to at least one corresponding database server (DBS) by implementing a logic that integrates a geographical proximity mean value (GPMV) and a sender internet protocol (IP) affinity value (SIPAV), wherein the at least one incoming transaction associated with the application corresponds to a sequence of operations performed on at least one corresponding DBS, wherein at least one incoming transaction associated with the application is routed to a failover database server determined by a predefined logic, if at least one corresponding DBS is unavailable to accept traffic, and wherein the sequence of operations corresponds to at least one of (i) a read operation, and (ii) a write operation;

processing, via one or more hardware processors, the at least one incoming transaction to extract at least one data manipulation language (DML) operation written directly by the application using a change data capture mechanism from a database and replicated to each DBS other than a DBS on which the application is directly applying a data through one or more incoming transactions;

generating, via the one or more hardware processors, a primary key by allocating at least one unique identifier if the at least one data manipulation language (DML)

operation is inserted on an identified database server (DBS), wherein each primary key corresponds to a numeric value;

updating, via the one or more hardware processors, at least one primary key of a record from the at least one incoming transaction, wherein the record correspond to one or more attributes, and wherein the update corresponds to a change in the one or more attributes; and dynamically monitoring, via the one or more hardware processors, if there is a conflict associated with a parent and a child association of at least one data manipulation language (DML) operation based on an integrity Foreign key Constraint error obtained by processing at least one inserted primary key on the record from the at least one incoming transaction;

wherein the GPMV corresponds to a score assigned to each potential route based on a geographical proximity, wherein a database server A receives a higher GPMV, if the database server A is closer to a destination than a database server B wherein the SIPAV corresponds to a sender internet protocol (IP) which comprises an affinity value associated with each DBS, and wherein a traffic of each client is routed to closest available DBS based on proximity of the sender IP of each client to the identified closest available DBS.

2. The processor implemented method of claim 1, wherein the primary key is generated by:

a) assigning, via the one or more hardware processors, a site identifier (Site_ID) to the identified DBS, wherein the identified DBS comprises at least one sequence incrementor object;

b) obtaining, via the one or more hardware processors, a next value (NextVal) from a sequence (V) of the identified database (DB) incrementing by n, wherein a next incremented value is to be returned as 1+n and 1+2n, and wherein 'n' corresponds to number of sites; and c) generating, via the one or more hardware processors, the primary key (p) by a call sequence object for a next value which returns the sequence (V) of the identified database (DB).

3. The processor implemented method of claim 1, wherein at least one incoming transaction is updated based on the primary key by:

a) extracting, via the one or more hardware processors, a candidate primary key identified for update associated with at least one incoming transaction as Vx;

b) determining, via the one or more hardware processors, an originating database server (a route_site_ID) by the candidate primary key and a modulo function n; and c) routing, via the one or more hardware processors, the update associated with at least one incoming transaction to the originated database server from the client.

4. The processor implemented method of claim 1, wherein at least one incoming transaction is updated based on the non-primary key by:

a) creating, via the one or more hardware processors, a framework to accept non-primary key update Structured Query Language;

b) executing, via the one or more hardware processors, another select query on a local database server DBSn, to select one or more potential primary keys to be updated;

c) executing, via the one or more hardware processors, a modulo function on all selected one or more potential primary keys to obtain resultant Route_Site_IDs; and d) routing, via the one or more hardware processors, a transaction to respective Route_Site_ID and executing an update statement on respective DBS.

5. The processor implemented method of claim 1, wherein the conflict associated with the parent and the child association of at least one data manipulation language (DML) operation is dynamically monitored by:

a) checking, via the one or more hardware processors, if there is the integrity Foreign key Constraint error on at least one DML operation is inserted on the identified database server (DBS);

b) determining, via the one or more hardware processors, the primary key of a parent record (Ppk) and calculating an associated Re-Route Site ID;

c) rerouting, via the one or more hardware processors, a transaction to a database server (DBSr) and calculating new PK for a child table; and d) executing, via the one or more hardware processors, an insert on the DBSr with new PK.

6. The processor implemented method of claim 1, wherein an addition of at least one database server by:

a) obtaining, via the one or more hardware processors, a downtime to record a global system change number with a timestamp (T_Add) which are relayed to at least one database server (DBS);

b) assigning, via the one or more hardware processors, a Site_Id n+1 to a new database server DBSn+1;

c) incrementing, via the one or more hardware processors, by value to generate a primary key which changes to n+1; and d) monitoring, via the one or more hardware processors, the timestamp(T_U) of record to be updated pre update present in the database server.

7. A system, comprising:

a memory storing a plurality of instructions;

one or more communication interfaces; and one or more hardware processors coupled to the memory via the one or more communication interfaces, wherein the one or more hardware processors are configured by the instructions to:

route at least one incoming transaction associated with an application to at least one corresponding database server (DBS) by implementing a logic that integrates a geographical proximity mean value (GPMV) and a sender internet protocol (IP) affinity value (SIPAV), wherein the at least one incoming transaction associated with the application corresponds to a sequence of operations performed on at least one corresponding DBS, wherein at least one incoming transaction associated with the application is routed to a failover database server determined by a predefined logic, if at least one corresponding DBS is unavailable to accept traffic, and wherein the sequence of operations corresponds to at least one of (i) a read operation, and (ii) a write operation;

process the at least one incoming transaction to extract at least one data manipulation language (DML) operation written directly by the application using a change data capture mechanism from a database and replicated to each DBS other than a DBS on which the application is directly applying a data through one or more incoming transactions;

generate a primary key by allocating at least one unique identifier if the at least one data manipulation language (DML) operation is inserted on an identified database server (DBS), wherein each primary key corresponds to a numeric value;

update at least one primary key of a record from the at least one incoming transaction, wherein the record correspond to one or more attributes, and wherein the update corresponds to a change in the one or more attributes; and dynamically monitor if there is a conflict associated with a parent and a child association of at least one data manipulation language (DML) operation based on an integrity Foreign key Constraint error obtained by processing at least one inserted primary key on the record from the at least one incoming transaction;

wherein the GPMV corresponds to a score assigned to each potential route based on a geographical proximity, wherein a database server A receives a higher GPMV, if the database server A is closer to a destination than a database server B, wherein the SIPAV corresponds to a sender internet protocol (IP) which comprises an affinity value associated with each DBS, and wherein a traffic of each client is routed to closest available DBS based on proximity of the sender IP of each client to the identified closest available DBS.

8. The system of claim 7, wherein the primary key is generated by:

a) assign a site identifier (Site_ID) to the identified DBS, wherein the identified DBS comprises at least one sequence incrementor object;

b) obtain a next value (NextVal) from a sequence (V) of the identified database (DB) incrementing by n, wherein a next incremented value is to be returned as 1+n and 1+2n, and wherein 'n' corresponds to number of sites; and c) generate the primary key (p) by a call sequence object for a next value which returns the sequence (V) of the identified database (DB).

9. The system of claim 7, wherein at least one incoming transaction is updated based on the primary key by:

a) extract a candidate primary key identified for update associated with at least one incoming transaction as Vx;

b) determine an originating database server (a route_site_ID) by the candidate primary key and a modulo function n; and c) route the update associated with at least one incoming transaction to the originated database server from the client.

10. The system of claim 7, wherein at least one incoming transaction is updated based on the non-primary key by:

a) create a framework to accept non-primary key update Structured Query Language;

b) execute another select query on a local database server DBSn, to select one or more potential primary keys to be updated;

c) execute a modulo function on all selected one or more potential primary keys to obtain resultant Route_Site_IDs; and d) route a transaction to respective Route_Site_ID and executing an update statement on respective DBS.

11. The system of claim 7, wherein the conflict associated with the parent and the child association of at least one data manipulation language (DML) operation is dynamically monitored by:

a) check if there is the integrity Foreign key Constraint error on at least one DML operation is inserted on the identified database server (DBS);

b) determine the primary key of a parent record (Ppk) and calculating an associated Re-Route Site ID;

c) reroute a transaction to a database server (DBSr) and calculating new PK for a child table; and d) execute an insert on the DBSr with new PK.

12. The system of claim 7, wherein an addition of at least one database server by:

a) obtain a downtime to record a global system change number with a timestamp (T_Add) which are relayed to at least one database server (DBS);

b) assign a Site_Id n+1 to a new database server DBSn+1;

c) increment by value to generate a primary key which changes to n+1; and d) monitor the timestamp(T_U) of record to be updated pre update present in the database server.

13. One or more non-transitory machine-readable information storage mediums comprising one or more instructions which when executed by one or more hardware processors cause:

routing at least one incoming transaction associated with an application to at least one corresponding database server (DBS) by implementing a logic that integrates a geographical proximity mean value (GPMV) and a sender internet protocol (IP) affinity value (SIPAV), wherein the at least one incoming transaction associated with the application corresponds to a sequence of operations performed on at least one corresponding DBS, wherein at least one incoming transaction associated with the application is routed to a failover database server determined by a predefined logic, if at least one corresponding DBS is unavailable to accept traffic, and wherein the sequence of operations corresponds to at least one of (i) a read operation, and (ii) a write operation;

processing the at least one incoming transaction to extract at least one data manipulation language (DML) operation written directly by the application using a change data capture mechanism from a database and replicated to each DBS other than a DBS on which the application is directly applying a data through one or more incoming transactions;

generating a primary key by allocating at least one unique identifier if the at least one data manipulation language (DML) operation is inserted on an identified database server (DBS), wherein each primary key corresponds to a numeric value;

updating at least one primary key of a record from the at least one incoming transaction, wherein the record correspond to one or more attributes, and wherein the update corresponds to a change in the one or more attributes; and dynamically monitoring if there is a conflict associated with a parent and a child association of at least one data manipulation language (DML) operation based on an integrity Foreign key Constraint error obtained by processing at least one inserted primary key on the record from the at least one incoming transaction;

wherein the GPMV corresponds to a score assigned to each potential route based on a geographical proximity, wherein a database server A receives a higher GPMV, if the database server A is closer to a destination than a database server B, wherein the SIPAV corresponds to a sender internet protocol (IP) which comprises an affinity value associated with each DBS, and wherein a traffic of each client is routed to closest available DBS based on proximity of the sender IP of each client to the identified closest available DBS.

14. The one or more non-transitory machine-readable information storage mediums of claim 13, wherein the primary key is generated by:

a) assigning, via the one or more hardware processors, a site identifier (Site_ID) to the identified DBS, wherein the identified DBS comprises at least one sequence incrementor object;

b) obtaining, via the one or more hardware processors, a next value (NextVal) from a sequence (V) of the identified database (DB) incrementing by n, wherein a next incremented value is to be returned as 1+n and 1+2n, and wherein 'n' corresponds to number of sites; and c) generating, via the one or more hardware processors, the primary key (p) by a call sequence object for a next value which returns the sequence (V) of the identified database (DB).

15. The one or more non-transitory machine-readable information storage mediums of claim 13, wherein at least one incoming transaction is updated based on the primary key by:

a) extracting, via the one or more hardware processors, a candidate primary key identified for update associated with at least one incoming transaction as Vx;

b) determining, via the one or more hardware processors, an originating database server (a route_site_ID) by the candidate primary key and a modulo function n; and c) routing, via the one or more hardware processors, the update associated with at least one incoming transaction to the originated database server from the client.

16. The one or more non-transitory machine-readable information storage mediums of claim 15, wherein at least one incoming transaction is updated based on the non-primary key by:

a) creating, via the one or more hardware processors, a framework to accept non-primary key update Structured Query Language;

b) executing, via the one or more hardware processors, another select query on a local database server DBSn, to select one or more potential primary keys to be updated;

c) executing, via the one or more hardware processors, a modulo function on all selected one or more potential primary keys to obtain resultant Route_Site_IDs; and d) routing, via the one or more hardware processors, a transaction to respective Route_Site_ID and executing an update statement on respective DBS.

17. The one or more non-transitory machine-readable information storage mediums of claim 13, wherein the conflict associated with the parent and the child association of at least one data manipulation language (DML) operation is dynamically monitored by:

a) checking, via the one or more hardware processors, if there is the integrity Foreign key Constraint error on at least one DML operation is inserted on the identified database server (DBS);

b) determining, via the one or more hardware processors, the primary key of a parent record (Ppk) and calculating an associated Re-Route Site ID;

c) rerouting, via the one or more hardware processors, a transaction to a database server (DBSr) and calculating new PK for a child table; and d) executing, via the one or more hardware processors, an insert on the DBSr with new PK;

wherein an addition of at least one database server by:

a) obtaining, via the one or more hardware processors, a downtime to record a global system change number with a timestamp (T_Add) which are relayed to at least one database server (DBS);

b) assigning, via the one or more hardware processors, a Site_Id n+1 to a new database server DBSn+1;

c) incrementing, via the one or more hardware processors, by value to generate a primary key which changes to n+1; and monitoring, via the one or more hardware processors, the timestamp(T_U) of record to be updated pre update present in the database server.

* * * * *